United States Patent [19]

Meneghello

[11] Patent Number: 4,936,536
[45] Date of Patent: Jun. 26, 1990

[54] POT LID HOLDER

[75] Inventor: Lino Meneghello, Burnaby, Canada

[73] Assignee: William Thomas Jones, Burnaby, Canada

[21] Appl. No.: 380,315

[22] Filed: Jul. 17, 1989

Related U.S. Application Data

[63] Continuation-in-part of Ser. No. 306,939, Feb. 7, 1989, abandoned.

[51] Int. Cl.⁵ .................................................. A47F 5/00
[52] U.S. Cl. .................................... 248/309.1; 248/909
[58] Field of Search ...................... 248/302, 309.1, 548, 248/558, 544, 909, 906; 211/13, 41, 32, 106; D6/467, 566; 72/379; 403/274

[56] References Cited

U.S. PATENT DOCUMENTS

| D. 262,843 | 2/1982  | Phillips  | D6/566  |
|------------|---------|-----------|---------|
| 383,092    | 5/1888  | Baker     | 248/302 |
| 1,034,439  | 8/1912  | Fuskerud  | 211/106 |
| 1,378,902  | 5/1921  | Roehl     | 248/302 |
| 1,608,497  | 11/1926 | Fischer   | 211/32  |
| 1,717,133  | 6/1929  | Welsh     | 211/106 |
| 1,986,486  | 1/1935  | Swanson   | 211/106 |
| 2,003,159  | 5/1935  | Taylor    | 248/909 |
| 2,198,825  | 4/1940  | Kuert     | 211/41  |
| 2,577,473  | 12/1951 | McEwen    | 211/32  |
| 2,608,305  | 8/1952  | Sager     | 211/106 |
| 2,633,994  | 4/1953  | Brown     | 211/106 |
| 2,662,717  | 12/1953 | Johnson   | 211/41  |
| 3,203,653  | 8/1965  | Hall      | 248/909 |
| 3,368,692  | 2/1968  | Voller    | 72/379  |
| 3,911,554  | 10/1975 | Ford      | 72/379  |
| 3,999,663  | 12/1976 | Walter    | 248/909 |
| 4,052,099  | 10/1977 | Lowery    | 248/909 |

Primary Examiner—Ramon O. Ramirez
Assistant Examiner—Robert A. Olson
Attorney, Agent, or Firm—Shlesinger & Myers

[57] ABSTRACT

A pot lid holder for a pot lid having a central knob which includes an elongated member having a recess intermediate ends thereof. The ends of the elongated member are joined by end sections which are fastenable to a flat surface and thereby permit insertion of a pot lid between the member and the flat surface. The recess receives and retains the central knob and provides support to the lid.

8 Claims, 2 Drawing Sheets

POT LID HOLDER

BACKGROUND

The present application is a continuation-in-part application of application Ser. No. 07/306,939 filed Feb. 7, 1989, now abandoned.

The present invention relates to a holder for a pot lid used to support the lid from a substantially vertical surface.

A common problem of storing pots together with their lids occurs when it is desired to stack the pots so as to save space. Obviously, with the lids in place on the pot stacking is impossible. One can remove the lids and attempt to store them together with the pots but again the usual curvature and shape of the lids makes them unstable and difficult to store a flat surface.

A known device used to store the lids separately against a vertical surface such as a cupboard door consists of a wire frame which is fastened to the vertical surface and which has a plurality of vertically spaced upwardly and outwardly directed wire racks. The lid is placed against the wire rack and supported near the bottom vertically while the upper portions of the wire rack prevent tipping of the lid and to some extent restrain lateral movement thereof. The device holds several vertically spaced lids. However, the lids have a tendency to roll off of the supports and fall upon rapid swinging motion of the cupboard door. Moreover, the structure projects out from the flat surface such that if installed on the inside of a standard cupboard door would interfere with or hit the cupboard shelves. A simple, more secure system for storing pot lids is needed.

Another problem with any product whose members extend in three dimensions is the volume taken to package and ship the product. Known pot lid holders occupy unacceptably large volumes making shipment costs for such holders relatively high.

Accordingly, an object for the invention is to provide an improved pot lid holder for storing a pot lid from a flat vertical surface. It is a further object of the invention to provide a pot lid holder which can be shipped in a flat form to facilitate shipping and bent into an operative form.

SUMMARY OF THE INVENTION holder for a pot lid having a central knob which includes an elongated member having a curved knob receiving portion intermediate side arms joined thereto and at each end joined by a flange. Each side arm has a laterally extending notch proximate an end thereof defining a flange arm. Each flange arm can be bent to a position transverse to its associated side arm. Thus, each flange is fastenable to a flat surface so as to space the elongated member away from the flat surface and thereby permit insertion between the member and the flat surface of a pot lid. The curved portion in the elongated member receives and retains the central knob of the pot lid and thereby supports the lid.

Preferably, the notches are V-grooves whose sides are at right angles to each other. Advantageously, the curved portion, side arms, and flange arms all lie in a common plane prior to bending of the flange arms.

The end sections may have flanged portions for permitting passage therethrough of screw fasteners. Both the elongated member and end sections are preferably made of polypropylene.

DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
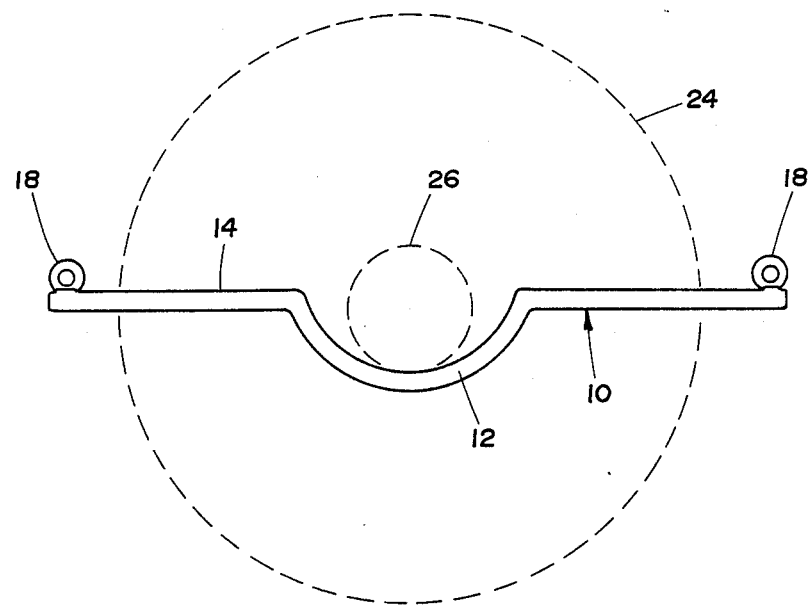
FIG. 1 is a front elevation view of the pot lid holder with a pot lid shown in broken lines.
Figure 2:
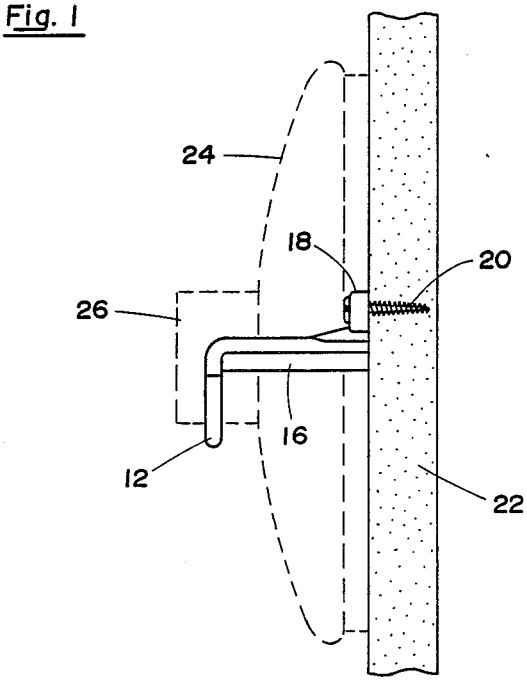
FIG. 2 is a side elevation view with a flat vertical panel shown in section to which the pot lid is fastened.

Referring to FIG. 1, the pot lid holder 10 is made up on an elongated rod 14 with a central semi-circular curved portion, integral side arms 12 and orthogonal flange arms 16 (see FIG. 2). The flange arms 16 each have a flange 18 adapted to receive a screw 20 for fastening the holder 10 to a vertical panel 22 or wall (not shown). Ordinarily, the holder 10 is made or a moulded plastic, capable of withstanding numerous bending movements such as polypropylene which is a light weight thermoplastic polymer of propylene.

Once fastened to a vertical surface, a pot lid, shown in broken lines in both FIGS. 1 and 2, is inserted between the elongated rod 14 and the panel 22. A central knob 26 of the pot lid 24 is received by curved portion 12 and serves to provide vertical support to the pot lid 24 to position the lid laterally and constrain sideways movement of the lid 24 in the event panel 22 is rotated rapidly as, for example, when panel 22 is cupboard door.

Flange arms 16 act as secondary stops to further constrain the lid 24 against lateral movement in the event the knob 26 moves excessively from the centre of curved portion of 12.

Figure 4:
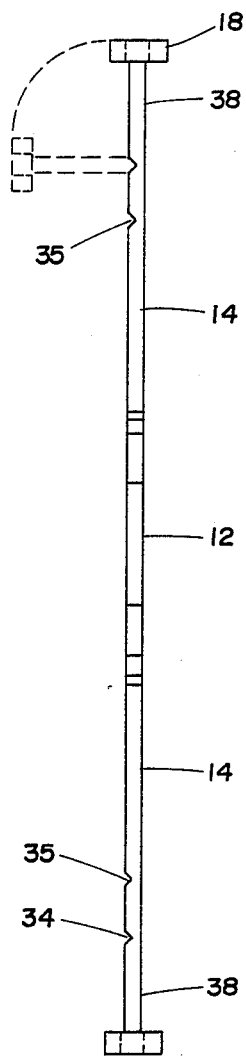
FIG. 4 is a plan view of the holder of FIG. 3 showing one flange arm in bent position in dotted lines.
Figure 3:
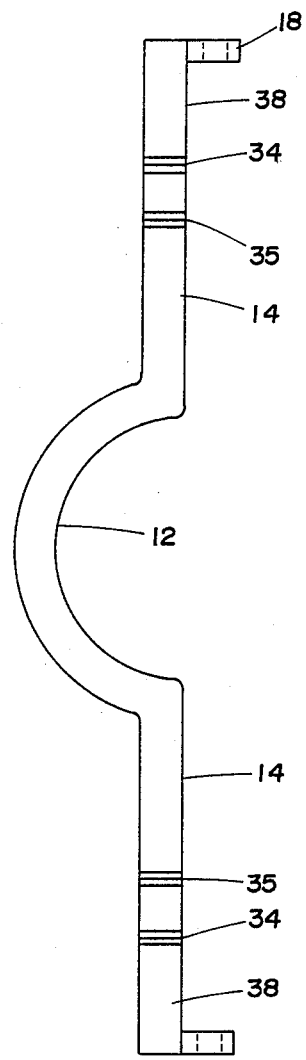
FIG. 3 is an elevation view of an unassembled pot lid holder.

To facilitate packaging and shipping the pot lid holder is fabricated in a flat form as shown in FIGS. 3 and 4. In each side arm 12 there is a V-groove 34 whose sides intersect at an angle of 90 degrees as seen in FIG. 4. The region between each groove 34 and the respective flange 18 defines a flange arm 38. Flange arm 38 is bendable about groove 34 from a flat position with respect to side arms 14 and curved portion 12 to a position at right angles to the latter. The 90 degree angle of the V-groove 34 prevents bending beyond the latter position. A second V-groove 35 is provided so as to enable selection of the desired flange arm length from one of two possible lengths. Obviously, any number of V-grooves may be provided.

Thus, holder 10 may be packaged and shipped in flat form and on installation, flange arms 38 bent.

Accordingly, while this invention has been described with reference to illustrative embodiments, this description is not intended to be construed in a limited sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention,

I claim:

1. A pot lid holder for use with a pot lid of a type having a central knob, comprising an elongated member having a curved knob receiving portion, a side arm affixed to each side of said curved portion, each of said side arms having a laterally extending notch proximate an end thereof defining a wall arm bendable inwardly to a position transverse to said side arms, and attachment means affixed to an end of each wall arm for attaching said wall arms to a support surface.

2. A pot lid holder according to claim 1, wherein said said attachment means includes a flange affixed to an end of each of said wall arms.

3. A pot lid holder according to claim 1, wherein said notch is a V-groove transverse to a corresponding one of said side arms.

4. A pot lid holder according to claim 1, wherein said elongated member is polypropylene.

5. A pot lid holder according to claim 1, wherein said curved knob receiving portion, said side arms and said wall arms are bendable to a substantially flat position.

6. A pot lid holder according to claim 1, wherein said curved portion is centrally located with respect to said member.

7. A pot lid holder for use with a pot lid of a type having a central knob, comprising an elongated member having a curved knob receiving portion; a side arm affixed to each side of said curved portion, each of said side arms having a plurality of spaced apart transversely extending notches therein defining associated arm portions of predetermined lengths, said side arm and arm portions bendable about said notches relative to one another.

8. A pot lid holder according to claim 7, wherein sides of each of said notches are V-grooves whose sides intersect at an angle of approximately 90 degrees.

* * * * *